2,835,510

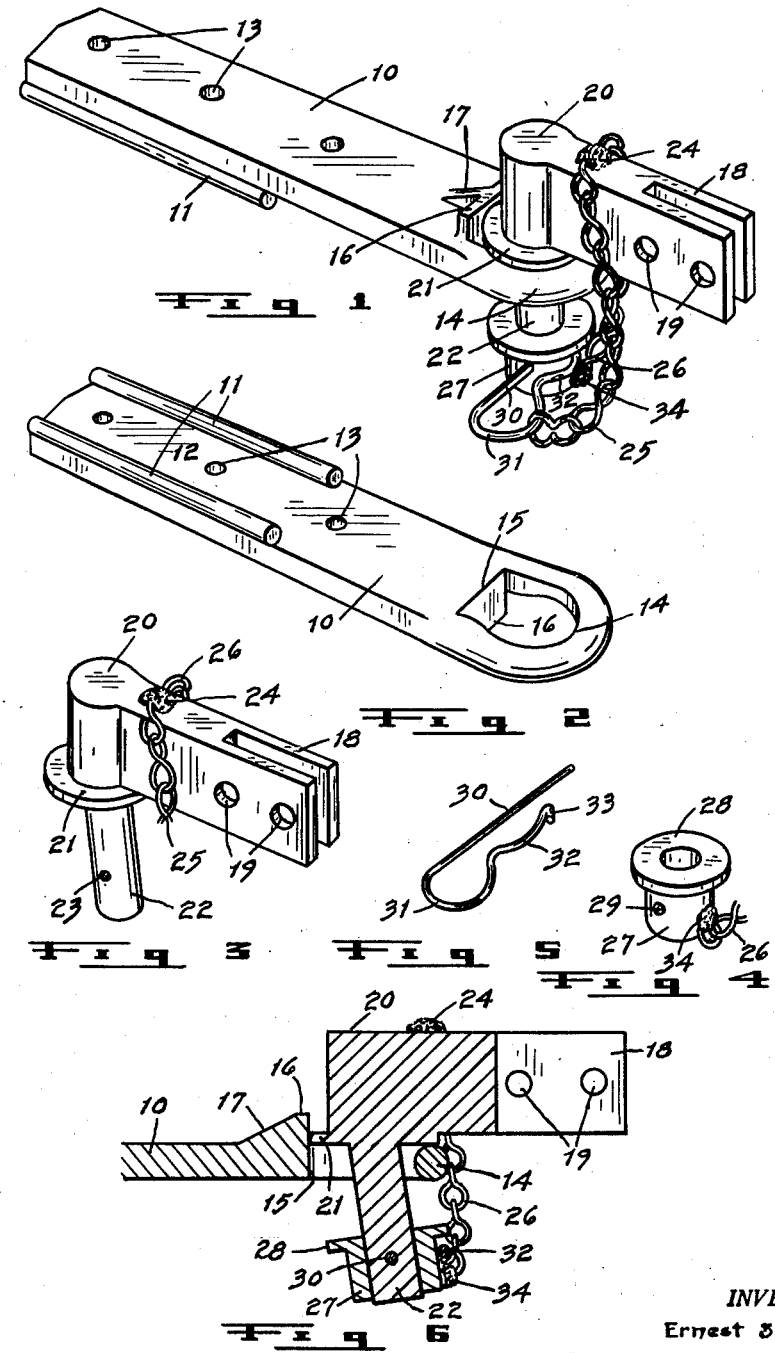

DRAW BAR HITCHES

Ernest Schoneberg, Rolla, N. Dak.

Application November 28, 1955, Serial No. 549,417

2 Claims. (Cl. 280—504)

Tractors are now quite common in farming and are used extensively to draw the various farm implements employed thereon. Various types of manufactured hitches are connected between the tractors and said various implements but they do not seem to have the freedom at their pivot points to allow for the swaying, tipping and general rolling of the two vehicles in relation to each other, especially when they are moving over farm terrain. Accordingly, the various hinge bolts or pivot pins on the hitch are inclined to jam, bend or break, or the hitch unit parts may break thus requiring extensive repairs, besides the time lost. Further, the hitch is usually secured to the tractor draw bar by a single bolt, or if two bolts are used, one may break. Therefor, the hitch is inclined to swing on the draw bar and the same applies to the connection at the implement. This often results in a tangling up of the hitch parts, especially when the tractor is reversed, and parts break. In other words; these hitches appear to be principally designed for their main function, forward draft, and little attention has been paid to the backing up.

The principal object of the present invention is to design the hitch in two main units and such that one unit thereof is rigidly attached to the tractor draw bar and the second unit rigidly attached to the drawn implement, and all hinging or pivoting of the vehicles in relation to each other is taken up at the junction or joint of these units, and said joint will permit free movement of said units in all directions.

A further object of the invention is to design the hitch so that the draft therethrough is always tending to be in a straight line and so exert an efficient draft pull without binding or breaking the units therein.

A further object of the invention is to design the hitch so that a direct positive pressure will be exerted rearwardly against the implement when the tractor moves backward while at the same time permit hinged turning of said rear vehicle, if desired.

Still further objects of the invention are to design the hitch in a simple, strong and sturdy manner for ease of manufacture and long life, simplicity of connection or release of the two vehicles, and with means for retaining the small parts to the larger units, so they will not be lost.

With the above important and other minor objects in view, which will become more apparent as the description proceeds, the invention consists essentially in the construction, design and arrangement of the various parts hereinafter more particularly described, reference being had to the accompanying drawings in which:

Figure 1 is a perspective view of the hitch assembly.

Figure 2 is a perspective view of the draft unit part of the hitch.

Figure 3 is a perspective view of the trailer unit part of the hitch.

Figure 4 is a perspective view of the fastening collar.

Figure 5 is a perspective view of the resilient locking key.

Figure 6 is a vertical section through the hitch assembly of Figure 1.

In the drawings like characters of reference indicate corresponding parts in the several figures.

The draft unit part of the hitch comprises an elongated plate 10 having a pair of spaced parallel rods 11 welded lengthwise on one face thereof. These rods are positioned adjacent the edges and extend from one end of the plate to a position near the centre thereof, to form a channel so to speak therebetween, and as indicated at 12. Three holes 13 are drilled through the plate 10 centrally of this channel and in equi-spaced relation therealong. The opposite end of the plate 10 is formed into an enlarged eye 14 which is of a somewhat U-shape, being rounded at its extermity while its base 15 is straight and crosswise of the plate 10, with right angled corners. The plate 10, along this base portion, projects upwardly in a cross web 16 which is backed by a central and forward sloping web 17, the arrangement being such that the rear face of the web 16 forms a vertical continuation of the wall of the eye base 15.

The trailer unit part of the hitch is a casting which presents a forked clevis 18 at one end thereof and with holes 19 therethrough while the opposite end or shank is rounded in a boss 20 having a lower enlarged circular flange 21. A rather stout pin 22 extends downwardly from the central bottom part of this flange to give the casting an almost right angled appearance. However, this pin is slightly angled or bent in the direction of the forks of the clevis. The lower end of the pin is provided with a cross hole 23 while the central part of a chain is welded at 24 to the top of the casting, slightly ahead of the clevis forks. The two ends of the chain are indicated at 25 and 26.

The fastening collar comprises a short tubing 27 having an enlarged circular flange 28 at its upper end and a hole 29 passing across the tubing.

The locking key comprises a straight wire 30 having one end thereof turned back in a circular eye 31, then bent again in a half-circle 32, this semi-circle being adjacent the straight portion 30 and terminating in a sharply turned-back snub or feeler 33.

In operating position, the draft unit 10 is placed on a draft bar of a tractor (not shown) with the rods 11 overhanging the sides of said bar, so that the channel 12 keeps the plate 10 aligned therewith. Bolts (not shown) pass through one or more of the holes 13 and through the draft bar to retain the plate thereto. The clevis 18 of the trailer unit is similarly secured to an implement (not shown) by suitable bolts (not shown) which pass through the holes 19. These bolts hold this latter unit rigid to the implement.

It might be mentioned at this time that the chain end 25 is hooked over or otherwise suitably secured to the eye 31 of the locking key while the other chain end 26 is welded at 34 to the side of the fastening collar.

When all parts are arranged as above, the implement is drawn to the tractor and the pin 22 of the trailer unit is dropped into and through the eye 14 of the draft unit until the flange 21 rests on the eye 14. The fastening collar 27 is then slipped over and up the pin 22 until the holes 29 and 23 are aligned. The straight part 30 of the locking key is passed through these holes while the snub 33 slides around the side of the fastening collar until the semi-circular part 32 slips in and frictionally locks thereover to prevent release (see Figure 1).

As the pin 22 has so much clearance in the eye 14 and is also permitted considerable vertical movement therethrough, the tractor can draw the implement over very rough farm land, with both vehicles rocking considerably, and all said movements can be accommodated by the hitch without strain or possibility of breakage, and sharp corners can also be turned as full pivoting is permitted between the hitch units. The channel 12, straddling the draw bar, insures that the plate 10 will not swing thereon, even if a bolt shears. The eye 14 always tends to climb up the pin 22, due to its angle, thus maintaining an almost straight line draft. If the tractor is backed, the base 15 of the eye 14 will positively press against the flange 21 of the trailer unit and so controllably push the implement rearward, including turns. To release the vehicles from each other, the locking key is withdrawn and the fastening collar will fall off. The pin 22 is then lifted out of the eye 14. The chain ends 25 and 26 insure that the key and collar will not be lost.

What I claim as my invention is:

1. A draw bar hitch, comprising: an elongated plate unit having an eye at one end thereof and the opposite end thereof of a channel-shape in cross section, and with holes therethrough, for aligned reception and bolt securing of a tractor draw bar therein; an angle-shaped trailer unit having one leg thereof presenting a forked clevis with holes therethrough for bolt attachment to an implement; the shank of said clevis having a lower enlarged flange; a pin extending downwardly from the centre of said flange as the opposite leg of said angle-shape and at slightly less than a right angle from said clevis; said pin of considerable less diameter than the opening in the eye of said plate unit and receivable therethrough until said flange rests on said eye, for hinging and rocking movements of said units in relation to each other; a collar slidably receivable on said pin, below said eye; and a removable key means through said collar and said pin to lock same together and limit the vertical movement of said pin through said eye.

2. A draw bar hitch, comprising: a plate unit and a trailer unit releasably hinged together; said plate unit consisting of an elongated plate having an eye at one end thereof and the opposite end of a channel-shape in cross section; holes through the channel end of said plate unit for bolt securing same in channel-aligned attachment to the draw bar of a tractor; said trailer unit angle-shaped, one leg of same presenting a forked clevis having a pin extending from the shank thereof at less than a right angle therefrom and as the second leg of said angle-shape; an enlarged flange on said pin, formed as part of the shank of said clevis; holes through the forks of said clevis for bolt securing same to an implement; said pin receivable through the opening in the eye of said plate unit, with considerable clearance therebetween, and until said flange rests on said eye; a tubular fastening collar telescopically receivable on said pin, below said eye; a locking key passing through said collar and said pin to hold said collar thereon and in a position to limit the movement of said pin through said eye; a continuation of said key frictionally passing around said collar for removable retention of said key therethrough; and an outwardly projecting cross web on said plate unit, adjacent the base of said eye, for contact with said flange when said plate unit is moved theretoward.

References Cited in the file of this patent

UNITED STATES PATENTS

| | | |
|---|---|---|
| 1,378,619 | Robertson | May 17, 1921 |
| 1,432,980 | Eadie | Oct. 24, 1922 |
| 1,745,136 | Williams | Jan. 28, 1930 |
| 1,780,186 | Hagel | Nov. 4, 1930 |
| 2,410,280 | Fergason | Oct. 29, 1946 |
| 2,444,876 | Kuhl | July 6, 1948 |
| 2,478,736 | Balzer | Aug. 9, 1949 |
| 2,749,145 | O'Donnell | June 5, 1956 |
| 2,769,646 | Omon et al. | Nov. 6, 1956 |